W. H. DOWNING.
Temper-Screw for Oil and Other Wells.
No. 215,589. Patented May 20, 1879.
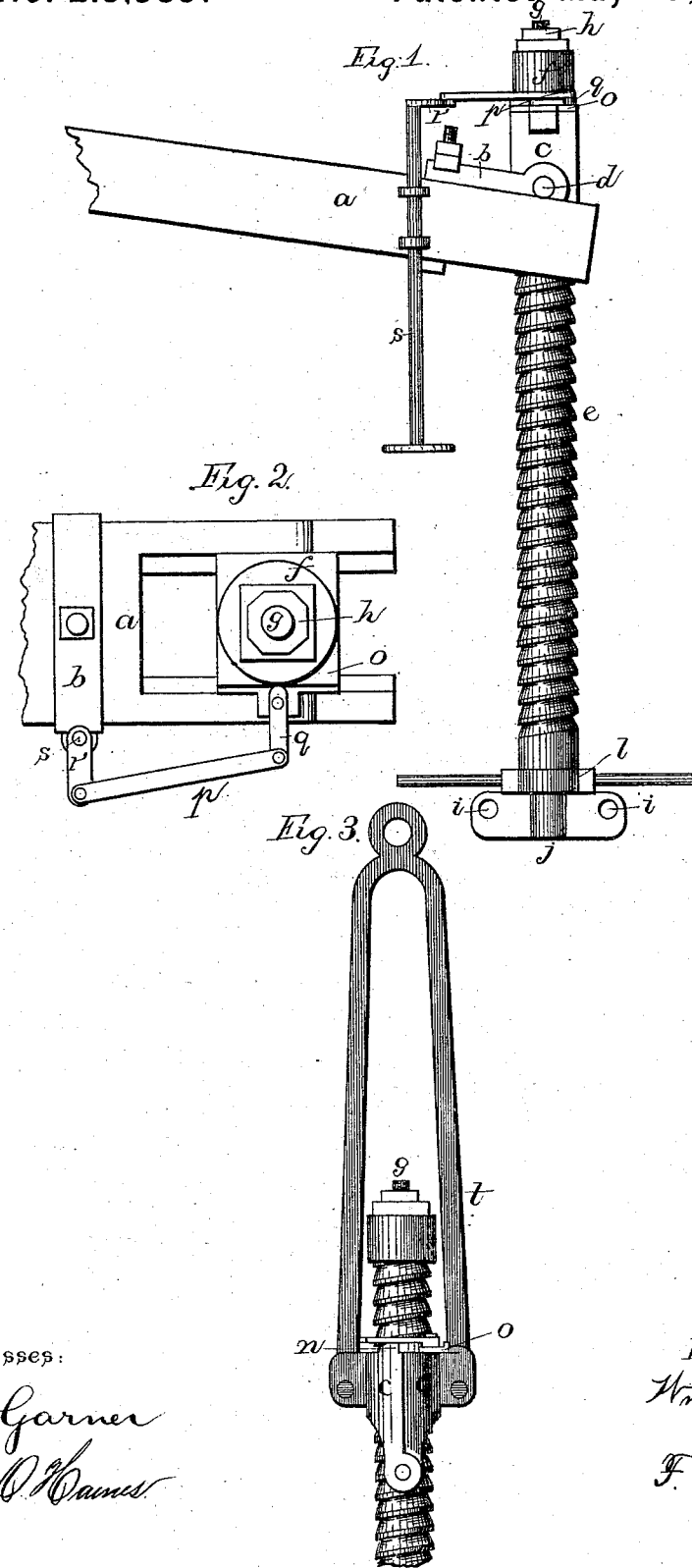

UNITED STATES PATENT OFFICE

WILLIAM H. DOWNING, OF MILLERSTOWN, ASSIGNOR TO ROBERT SALVAGE, OF BARNHART'S MILLS, AND GEORGE H. DOWNING, OF PARKER CITY, PENNSYLVANIA, ONE-THIRD TO EACH.

IMPROVEMENT IN TEMPER-SCREWS FOR OIL AND OTHER WELLS.

Specification forming part of Letters Patent No. 215,589, dated May 20, 1879; application filed April 7, 1879.

*To all whom it may concern:*

Be it known that I, WILLIAM H. DOWNING, of Millerstown, in the county of Butler and State of Pennsylvania, have invented certain new and useful Improvements in Temper-Screws for Oil and other Wells; and I do hereby declare the following to be a full, clear, and exact description of the invention, such as will enable others skilled in the art to which it pertains to make and use it, reference being had to the accompanying drawings, which form part of this specification.

My invention relates to an improvement in temper-screws; and it consists in the arrangement and combination of parts, that will be more fully described hereinafter, whereby the screw may be used with reins, or may be applied directly to the end of the walking-beam without the intervention of the reins.

Figure 1 is a side elevation of the screw applied to the end of the beam. Fig. 2 is a plan view of the same. Fig. 3 is a side elevation of the screw in the reins.

$a$ represents the end of the walking-beam, which is bifurcated, so as to allow the screw to pass up through it. Held in position on this beam by means of a suitable clamp, $b$, is the divided nut $c$, which is provided with the trunnions $d$, so that it can accommodate itself to the motion of the beam, and thus always keep the screw $e$ vertical.

The two parts of the nut are pivoted together at their lower ends, so that the upper ends can open outward, and thus no longer have their threads engage with those on the screw, when the screw can drop down its full length. The weight of the screw holds the two parts together like a vise; but when the nut is relieved of this weight and the screw raised upward the nut opens at its top, so that the screw will slide right through to any desired height without the trouble of turning it round and round. This screw is made hollow, and up through it is passed the rod $g$, which has the swivel $f$ and jam-nut $h$ screwed upon its upper end. This swivel holds the rod in place, and yet allows it to turn freely around.

To the lower end of the rod $g$ is secured the cross-piece $j$, which has suitable holes $i$ through it to fasten the cable or rope clamps in, and thus connect the clamps to the screw. Upon the end of the screw, just above the cross-piece $j$, is the bar $l$, or handle by which to turn the screw around.

Upon the top of the divided nut is pivoted the plate $o$, which bears against the two projections $n$ on the opposite half of the nut, for the purpose of forcing the two halves far enough apart to allow the screw to freely revolve. To this plate is pivoted the short rod $q$, which has pivoted to its outer end the rod $p$. To the outer end of the rod $p$ is connected the crank $r$, on the top of the rod $s$, fastened to the side of the beam, and which rod extends down within reach of the operator. By turning this rod the screw is released sufficiently to turn freely in either direction.

Thus it will be seen that the screw is connected directly to the walking-beam without the intervention of the reins, and that by using a divided nut on the beam the screw can be quickly adjusted to any desired position. When it is necessary to lengthen the screw, a pipe or tube is connected to its lower end by means of a common screw-coupling, and then the rod $g$ is made long enough to pass up through both tube and screw.

When the screw is used with reins $t$ the operation will be the same, with this difference, that the nut and operating-cam will always be in reach of the operator.

Where the screw is in the reins and it is desired to change it to the beam, or vice versa, the nut and swivel must first be taken off, the rod $g$ taken out, and then the screw removed from the nut it is in, and then passed up through the other nut to which it is to be applied, and the parts restored to their places.

Having thus described my invention, I claim—

1. In combination with the screw, a divided nut that is pivoted together at its lower ends, substantially as shown.

2. The combination of a walking-beam, a nut having trunnions, and the screw, whereby the screw is applied directly to the beam, substantially as described.

3. The combination of a walking-beam bifurcated at one end, a divided nut secured thereto by a clamp, and a temper-screw, substantially as set forth.

4. The combination of the screw, a divided nut, and a cam or lever for opening the nut at its upper end to let the screw turn round, substantially as specified.

In testimony that I claim the foregoing I have hereunto set my hand this 21st day of March, 1879.

WILLIAM H. DOWNING.

Witnesses:
 JOHN A. CRAWFORD,
 G. W. REEP.